ly and/or electromagnetically actuable actuator; the
tank control device is connected to the actuator by means of
a first data exchange connection and to the fill level sensor
by means of a second data exchange connection; the fill level
sensor is designed to transmit data representing a fill level of
the operating fluid container to the tank control device via
the second data exchange connection; the tank control
device is designed to transmit a filling stop signal to the

United States Patent
Wolf et al.

(10) Patent No.: US 10,994,604 B2
(45) Date of Patent: May 4, 2021

(54) OPERATING FLUID CONTAINER FOR A MOTOR VEHICLE

(71) Applicant: KAUTEX TEXTRON GmbH & Co. KG, Bonn (DE)

(72) Inventors: Hartmut Wolf, Konigswinter (DE); Theodor Ossege, Rheinbreitbach (DE)

(73) Assignee: KAUTEX TEXTRON GmbH & Co. KG, Bonn (DE)

( * ) Notice: Subject to any disclaimer, the term of this patent is extended or adjusted under 35 U.S.C. 154(b) by 0 days.

(21) Appl. No.: 15/759,818

(22) PCT Filed: Sep. 15, 2016

(86) PCT No.: PCT/EP2016/071814
§ 371 (c)(1),
(2) Date: Mar. 13, 2018

(87) PCT Pub. No.: WO2017/046240
PCT Pub. Date: Mar. 23, 2017

(65) Prior Publication Data
US 2019/0047406 A1    Feb. 14, 2019

(30) Foreign Application Priority Data
Sep. 15, 2015 (DE) .......... 102015217609.6

(51) Int. Cl.
*B60K 15/035* (2006.01)
*B60K 15/03* (2006.01)
*G01F 23/00* (2006.01)

(52) U.S. Cl.
CPC ........ *B60K 15/03519* (2013.01); *B60K 15/03* (2013.01); *B60K 15/03504* (2013.01);
(Continued)

(58) Field of Classification Search
CPC ........ B60K 15/03519; B60K 15/03504; B60K 2015/03203; B60K 2015/03217;
(Continued)

(56) References Cited

U.S. PATENT DOCUMENTS 2,148,338 A * 2/1939 Croston ................. B60K 15/05
                                                    292/144
2,620,822 A * 12/1952 Peterson ................ B60K 15/05
                                                    137/588
(Continued)

FOREIGN PATENT DOCUMENTS

CN    101219639 A    7/2008
DE    1295492 A1     5/1969
(Continued)

OTHER PUBLICATIONS

International Search Report and Written Opinion dated Feb. 2, 2017 issued in International Application No. PCT/EP2016/071814 filed Sep. 15, 2016.
(Continued)

*Primary Examiner* — Timothy L Maust
*Assistant Examiner* — James R Hakomaki
(74) *Attorney, Agent, or Firm* — Wiley Rein LLP (57) ABSTRACT

The present invention discloses an operating fluid container for a motor vehicle, wherein the operating fluid container comprises a fill level sensor, a tank control device and an electrically and/or electromagnetically actuable actuator; the tank control device is connected to the actuator by means of a first data exchange connection and to the fill level sensor by means of a second data exchange connection; the fill level sensor is designed to transmit data representing a fill level of the operating fluid container to the tank control device via the second data exchange connection; the tank control device is designed to transmit a filling stop signal to the (Continued)

actuator via the first data exchange connection upon receiving data which represent a predetermined fill level of the operating fluid container; and the actuator initiates the termination of a filling procedure of the operating fluid container upon receiving the filling stop signal.

13 Claims, 2 Drawing Sheets

(52) U.S. Cl.
CPC .......... *G01F 23/00* (2013.01); *G01F 23/0076* (2013.01); *B60K 2015/03203* (2013.01); *B60K 2015/03217* (2013.01); *B60K 2015/03368* (2013.01); *B60K 2015/03514* (2013.01); *B60Y 2400/301* (2013.01); *B60Y 2400/4045* (2013.01)

(58) Field of Classification Search
CPC ...... B60K 2015/03368; G01F 23/0076; B60Y 2400/301; B60Y 2400/4045
USPC .......................................................... 141/95
See application file for complete search history.

(56) References Cited

U.S. PATENT DOCUMENTS

| | | | | |
|---|---|---|---|---|
| 3,786,421 A * | 1/1974 | Wostl | .................... | B67D 7/14 235/381 |
| 4,522,237 A * | 6/1985 | Endo | .................... | B67D 7/465 141/128 |
| 5,072,615 A | 12/1991 | Nawrocki | | |
| 5,163,473 A * | 11/1992 | Strnad, Jr. | .............. | B60K 15/04 137/588 |
| 5,829,491 A | 11/1998 | Bennett | | |
| 5,842,188 A * | 11/1998 | Ramsey | ................... | G07F 5/24 705/416 |
| 5,895,457 A * | 4/1999 | Kurowski | ............... | G07F 9/002 705/413 |
| 6,029,635 A * | 2/2000 | Sekine | ................. | B60K 15/035 123/516 |
| 6,164,123 A * | 12/2000 | Corkill | ............... | F02M 25/0809 123/518 |
| 6,252,499 B1 * | 6/2001 | Gerdtz | ................ | G01F 23/0076 340/450.2 |
| 6,435,164 B1 * | 8/2002 | Kaiser | ................ | F02M 25/0809 123/1 A |
| 6,488,015 B2 * | 12/2002 | Isobe | .................. | F02M 25/089 123/198 D |
| 6,681,815 B1 * | 1/2004 | Westrich | .............. | B67D 7/3218 141/198 |
| 6,766,837 B1 | 7/2004 | Ruffa | | |
| 7,347,191 B2 * | 3/2008 | Atwood | ............... | B60K 15/035 123/516 |
| 7,735,365 B2 * | 6/2010 | Crain | .................... | G01G 17/04 141/83 |
| 7,866,356 B2 * | 1/2011 | Benjey | ................. | B67D 7/0476 141/198 |
| 8,161,813 B2 * | 4/2012 | Faist | ........................ | G01C 9/00 73/291 |
| 8,448,665 B1 * | 5/2013 | Anderson | ............... | G01F 23/18 137/558 |
| 8,538,591 B1 | 9/2013 | Klughart | | |
| 8,831,866 B2 * | 9/2014 | Nakano | ................... | B60L 50/16 701/123 |
| 2002/0153374 A1 | 10/2002 | Isobe | | |
| 2005/0083636 A1 * | 4/2005 | Kim | ..................... | B60K 15/077 361/329 |
| 2006/0032547 A1 | 2/2006 | Rossi | | |
| 2007/0192221 A1 * | 8/2007 | Sandor | ................... | G06Q 40/00 705/35 |
| 2010/0076734 A1 * | 3/2010 | Volto | ....................... | G06F 30/15 703/2 |
| 2010/0102997 A1 * | 4/2010 | Pikolon | .................. | B60K 15/00 341/22 |
| 2010/0224263 A1 | 9/2010 | Riedel et al. | | |
| 2010/0252006 A1 * | 10/2010 | Reddy | ............. | B60K 15/03504 123/519 |
| 2011/0209789 A1 * | 9/2011 | Murabayashi | ..... | F02M 37/0094 137/899 |
| 2012/0136762 A1 * | 5/2012 | Wissenbach | ........... | G06Q 30/02 705/30 |
| 2012/0247616 A1 * | 10/2012 | Lauber | ................... | B67D 7/048 141/387 |
| 2014/0229233 A1 * | 8/2014 | Hu | ..................... | G06Q 30/0202 705/7.31 |
| 2014/0278837 A1 * | 9/2014 | Blumer | .................. | G07B 15/00 705/13 |
| 2015/0027571 A1 | 1/2015 | Kishi et al. | | |
| 2015/0120490 A1 * | 4/2015 | Subbarayan | ....... | G06Q 30/0621 705/26.5 |
| 2016/0060093 A1 * | 3/2016 | Criel | .................... | B60K 15/035 137/2 |
| 2016/0144711 A1 * | 5/2016 | Criel | ............... | B60K 15/03519 137/14 |
| 2017/0066322 A1 * | 3/2017 | Dudar | ................ | F02D 41/3082 |
| 2018/0015820 A1 * | 1/2018 | Mills | .................. | F02M 37/0082 |
| 2018/0096326 A1 * | 4/2018 | Szeto | .................... | G06Q 20/40 |

FOREIGN PATENT DOCUMENTS

| | | | | |
|---|---|---|---|---|
| DE | 3725752 A1 | 3/1989 | | |
| DE | 19824671 C2 | 12/1998 | | |
| DE | 19834671 C1 | 2/2000 | | |
| DE | 10020000 A1 * | 12/2001 | ............. | B60K 15/04 |
| DE | 202006013601 U1 | 2/2008 | | |
| DE | 102010048841 A1 | 4/2012 | | |
| DE | 102012024865 A1 | 6/2014 | | |
| DE | 102013207425 A1 | 11/2014 | | |
| EP | 0088740 A2 | 9/1983 | | |
| EP | 0956992 A2 * | 11/1999 | ............. | B60K 15/04 |
| EP | 2098837 A1 | 9/2009 | | |
| JP | H11-255299 A | 9/1999 | | |
| JP | A 2005-289502 | 3/2006 | | |
| KR | 20060058243 A * | 5/2006 | | |
| WO | 2011012937 A1 | 2/2011 | | |
| WO | WO-2011048579 A2 * | 4/2011 | ............. | B60K 15/00 |

OTHER PUBLICATIONS

Chinese Office Action, dated Dec. 28, 2018, in Chinese Application No. mailed Dec. 28, 2018, issued in International Application No. PCT/EP2016/071814 filed Sep. 15, 2016.

* cited by examiner

OPERATING FLUID CONTAINER FOR A MOTOR VEHICLE

RELATED APPLICATIONS

This application is a § 371 National Stage Application of PCT/EP2016/071814, filed Sep. 15, 2016, which claims priority benefit of German Patent Application No. 102015217609.6, filed Sep. 15, 2015, which applications are incorporated entirely by reference herein for all purposes.

FIELD

The present invention relates to an operating fluid container for a motor vehicle. The present furthermore relates to a method for filling an operating fluid container.

SUMMARY AND DESCRIPTION OF RELATED ART

In operating fluid containers known from the prior art, which are designed for example as fuel containers or as urea containers, a filling procedure is either terminated manually by a person carrying out the refueling or automatically by a filling device, for example a nozzle of a fuel dispenser, when a maximum fill height of the operating fluid container is reached and a valve seat of a refueling vent valve is closed by the valve body thereof owing to its buoyancy in the operating fluid, so that further venting during refueling is not enabled. Consequently, when operating fluid is further introduced into a filler pipe of the operating fluid container, the pressure in the operating fluid container rises, whereupon an operating fluid level in the filler pipe which reaches a shut-off opening in the nozzle discharging the operating fluid is reached, whereupon the filling procedure is terminated by the nozzle.

The consequence of this situation is that the refueling volume dispensed into the operating fluid container has been estimated by the person carrying out the refueling and considered sufficient by the person carrying out the refueling to reach a target level, or that the operating fluid container is filled up to the maximum fill height.

A further problem with the operating fluid containers known from the prior art is their susceptibility to tilt-related variations. This is the case since, with a purely mechanically introduced filling stop (closing a valve seat by means of a valve body), either the filling stop is introduced too early or the filling stop is introduced too late at different tilts of the operating fluid container, which means that the operating fluid container can be filled with too little or too much operating fluid after the termination of the filling procedure.

A further problem in the case of the operating fluid containers known from the prior art consists in market-specific refueling behaviors of the person carrying out the refueling. Therefore, in some countries, for example the United States of America, it is desirable to fill the operating fluid container up to a flat currency amount so that the payment involves the return of as little change as possible. In other countries, such as the Federal Republic of Germany, on the other hand, it is often desired that, after the automatic shut-off as a result of reaching the maximum filling height, the tank can still be topped up again up to three times so that the person carrying out the refueling is given the impression that the operating fluid container has been filled to the maximum. In other countries such as Japan, for example, it is desired that, after the termination of the filling procedure, the operating fluid is in the filler pipe so that the person carrying out the refueling can see the operating fluid column in the filler pipe or in the filler neck and has the impression that the absolute maximum quantity has been dispensed into the operating fluid container.

DE 198 34 671 C1 describes a method and a device for refueling a motor vehicle. The device here comprises a tank, in which a fill level sensor is arranged. The fill level sensor is data-coupled to a tank control unit via a data line. The tank control unit is furthermore data-coupled to a control device of a fuel dispenser via a light-emitting diode and of a light-emitting diode provided in a nozzle, wherein the nozzle is fluidically connected to the fuel dispenser via a filler hose. Upon reaching a predetermined fill level in the tank, the control device of the fuel dispenser initiates a filling stop of the tank. Owing to the data exchange connection between the tank control unit and the control device of the fuel dispenser, the fill level sensor of the tank and the corresponding filler sensors of the fuel dispenser can be mutually calibrated.

The consequence of these market-specific shut-off behaviors is that manufacturers of operating fluid containers have to provide different operating fluid containers for different markets, which results in increased production and storage costs.

SUMMARY OF THE INVENTION

An object on which the present invention is based is consequently to provide an operating fluid container by means of which the termination of a filling procedure can be introduced or initiated on the part of the operating fluid container. An object on which the present invention is based is furthermore to provide an operating fluid container which is filled with the nominal fill quantity after the termination of a filling procedure, irrespective of a possible tilt. An object on which the present invention is based is furthermore to provide an operating fluid container by means of which different shut-off characteristics can be realized. A further of the present invention is to provide a method for refueling an operating fluid container which takes into account the different refueling practices in different markets.

These objects are achieved by an operating fluid container having the features of claim 1. Advantageous embodiments are described in the dependent claims.

More precisely, the object on which the present invention is based is achieved by an operating fluid container for a motor vehicle which comprises a fill level sensor, a tank control device and at least one electrically and/or electromagnetically actuable actuator, wherein the termination of a filling procedure of the operating fluid container can be initiated by means of the actuator. The tank control device here is connected to the actuator by means of a first data exchange connection and to the fill level sensor by means of a second data exchange connection. The fill level sensor is designed to transmit data which represent a fill level of the operating fluid container to the tank control device via the second data exchange connection. The tank control device is in turn designed to transmit a filling stop signal to the actuator via the first data exchange connection upon receiving data which represent a predetermined fill level of the operating fluid container, wherein the actuator initiates the termination of a filling procedure of the operating fluid container upon receiving the filling stop signal.

The operating fluid container according to the invention is advantageous in that the termination of a filling procedure can be initiated by the tank controlling device before a maximum fill height of the operating fluid container is reached, for example. Therefore, a dispensing quantity of operating fluid can be identified for example by the tank control device or by another electronic unit (e.g. an on-board computer or a smartphone) taking into account navigation data and an average consumption of the motor vehicle, for example, wherein, upon reaching the quantity to be dispensed as identified by the fill level sensor, the filling stop signal is issued to one of the actuators, thereby initiating the termination of the filling procedure.

By providing an electrically and/or electromagnetically actuable actuator for terminating a filling procedure of the operating fluid container, it is furthermore achieved that the filling procedure does not have to be terminated mechanically. By initiating the termination of a filling procedure by means of an electrically and/or electromagnetically actuable actuator, it is possible to implement tilt compensation, in which a tilt of the operating fluid container is taken into account and compensated during the filling procedure. This is the case since the termination of the filling procedure is not realized by a valve body floating in a valve, but is instead initiated by means of an electrical signal which is issued by the tank control device.

Through a corresponding adaptation of the tank control device, it is moreover possible to issue the filling stop signal at a point in time before the maximum filling height of the operating fluid container is reached, so that a market-specific shut-off can then be implemented, taking into account different shut-off characteristics.

It is therefore possible, for example, to terminate the refueling procedure shortly before reaching the maximum filling height, whereupon a filling device (e.g. a fuel dispenser) continues the filling procedure until a filling quantity which corresponds to a flat currency amount has been dispensed into the operating fluid container. It is moreover also possible, after initiating the termination of the filling procedure, to continue the filling on the part of a filling device (fuel dispenser) at a reduced delivery speed, so that the operating fluid rises slowly in a filler pipe of the operating fluid container and, after reaching a shut-off bore (a fuel nozzle of the filling device), the operating fluid remains in the filler pipe for a predetermined time so that it can be perceived visually by the person carrying out the refueling. A corresponding shut-off characteristic is particularly relevant for the Japanese market. Moreover, it is however also possible to terminate the filling procedure by means of the tank control device at a point in time which enables the person carrying out the refueling to top up the tank three times. This is particularly relevant for the European market, in particular for the German market.

The operating fluid container can be designed as a fuel container for gas or diesel, for example. However, the operating fluid container can also be designed as a urea container (SCR container) or water container.

The operating fluid container includes the container itself, a filler pipe via which operating fluid is to be supplied into the container, a filler neck, which is secured in the filler pipe and is in fluidic communication therewith, vent lines of the container, in particular the vent line to an active carbon filter.

The tank control device is designed as an electronic data processing device, which comprises a signal output line and preferably also a signal input line. The first data exchange connection is realized by means of the signal output line and the second data exchange connection is realized by the signal input line.

Within the context of the present invention, an electrically or electromagnetically actuable actuator is also understood to refer to an electromechanically actuable actuator.

A bidirectional data transfer is preferably also possible via the first data exchange connection. A bidirectional data transfer is furthermore preferably also enabled via the second data exchange connection.

The fill level sensor is arranged within the operating fluid container and designed to determine the fill level thereof. In particular, the fill level sensor is designed to transmit a stop signal to the tank control device when a predetermined fill level is reached. The tank control device is then in turn designed to send a filling stop signal to at least one of the actuators upon receiving the stop signal issued by the fill level sensor.

The tank control device is preferably connected to a filling device by means of a third data exchange connection, wherein the tank control device is designed to transmit the filling stop signal to the filling device via the third data exchange connection upon receiving data which represent the predetermined fill level of the operating fluid container.

A correspondingly designed operating fluid container is advantageous in that the filling stop can be realized more accurately since pressure does not have to be built up within the operating fluid container to terminate the filling procedure. Therefore, with the correspondingly designed operating fluid container, it is again more easily possible to dispense the nominal dispensing quantity of operating fluid into the operating fluid container in spite of a tilt of the operating fluid container. Furthermore, with the correspondingly designed operating fluid container, it is again more easily possible to terminate the filling procedure upon reaching a predetermined filling level which is below the maximum filling level of the operating fluid container so that the above-mentioned different shut-off characteristics for different markets can be realized on the part of the tank control device.

The filling device can be for example a fuel dispenser having a nozzle, wherein the filling stop is realized either in the fuel dispenser and/or in the nozzle.

The third data exchange connection is preferably designed as a wireless data exchange connection, which can be realized for example via near field communication (NFC), Bluetooth, GSM (global system for mobile communication) or via another wireless data connection.

The tank control device is preferably designed to receive data representing an inclination of the operating fluid container in addition to the data transmitted by the fill level sensor, wherein the tank control device identifies an actual fill level of the operating fluid container using the data representing the fill level and the data representing the inclination of the operating fluid container.

As a result of a corresponding design of the operating fluid container, even more precise termination of the filling procedure is achieved since tilts of the operating fluid container are taken into account when determining the filling height. The data representing the inclination of the operating fluid container can be provided for example by an inclination sensor of the motor vehicle.

The actual fill level corresponds to the fill level of the operating fluid container (the nominal fill level of the operating fluid container) when the operating fluid container is not inclined, i.e. when the motor vehicle is positioned on a horizontal plane without an inclination.

The relationship between the fill level sensor signal, the data representing the inclination of the operating fluid container and the actual fill height of the operating fluid container is preferably stored in a correction map, which is preferably stored in the tank control device. To generate the correction map, the operating fluid container can be inclined about a horizontal axis in 5° steps, for example, and, in each tilted position, the operating fluid container can be rotated about the vertical axis and through 360° in 5° steps. In each of these tilt and rotational points, a high-volume characteristic is generated and entered into the correction map. The correction map then serves for determining the exact quantity of operating fluid in the operating fluid container.

The operating fluid container preferably comprises an inclination sensor by means of which the inclination of the operating fluid container can be determined. The inclination sensor here is connected to the tank control device via the second data exchange connection and/or via a further data exchange connection, which can be realized via a further signal line via which data identified by the inclination sensor and representing the inclination of the operating fluid container can be transmitted to the tank control device.

The operating fluid container is preferably designed in such a way that the at least one actuator is designed as a service and/or refueling vent valve which is arranged in the operating fluid container. The service and/or refueling vent valve here is electrically and/or electromagnetically actuable/adjustable between an open position and a closed position, wherein, in the open position of the service and/or refueling vent valve, the operating fluid container is fluidically connected to a vent line by means of the service and/or refueling vent valve and wherein, in the closed position of the service and/or refueling vent valve, the operating fluid container is fluidically separated from the vent line by means of the service and/or refueling vent valve.

The use of the service and/or refueling vent valve for terminating a filling procedure is advantageous in that valve devices which are required in any case for the operation of the operating fluid container are used to terminate the filling procedure electrically and/or electromagnetically, which means that there is no need to install further components in the operating fluid container and the complexity of the correspondingly designed operating fluid container is therefore not increased.

The operating fluid container is preferably designed in such a way that the at least one actuator is designed as a non-return valve which is arranged in a filler pipe leading into the operating fluid container. The non-return valve here is electrically and/or electromagnetically actuable/adjustable between an open position and a closed position, wherein, in the open position of the non-return valve, the operating fluid container is fluidically connected to the filler pipe and wherein, in the closed position of the non-return valve, the operating fluid container is fluidically separated from the filler pipe by means of the non-return valve or the clear width of the filler pipe is reduced by means of the non-return valve.

The operating fluid container is furthermore preferably designed in such a way that the at least one actuator is designed as an interfering body which is arranged in a filler pipe leading into the operating fluid container, wherein the interfering body is electrically and/or electromagnetically actuable between an open position and an interfering position, wherein, in the interfering position of the interfering body, a clear width of the filler pipe is not reduced and wherein, in the interfering position of the interfering body, this latter projects into the filler pipe and reduces the clear width of the filler pipe.

The operating fluid container is furthermore preferably designed in such a way that the at least one actuator is designed as an electromagnet, which is arranged in a filler neck of a filler pipe leading into the operating fluid container, wherein the electromagnet is actuable/adjustable between an active state and a passive state. In the active state, the electromagnet generates a magnetic field and, in the passive state, the electromagnet does not generate a magnetic field.

The three latter described embodiments of the operating fluid container are advantageous in that an internal pressure does not have to be built up in the operating fluid container to terminate the filling procedure, which means that the operating fluid container is at substantially zero pressure after the termination of the filling procedure. Since internal pressure is not built up, the operating fluid container also does not expand, which means that the precision when determining the fill quantity in the operating fluid container is increased. Furthermore, the fact that pressure does not have to be built up in the operating fluid container to terminate the filling procedure is advantageous in that the operating fluid quantity dispensed into the operating fluid container corresponds more precisely to the operating fluid quantity to be dispensed into the operating fluid container. This is the case since the gas volume remaining in the operating fluid container does not function as a compressible gas spring. The quantity of operating fluid dispensed into the filler pipe can be determined very precisely so that the precision of the dispensed quantity of operating fluid is increased.

In a further preferred embodiment, the operating fluid container is designed in such a way that the at least one actuator is designed as a cutoff valve which is arranged between the operating fluid container and an active carbon filter. The cutoff valve is electrically and/or electromagnetically actuable/adjustable between an open position and a closed position, wherein, in the open position of the cutoff valve, the operating fluid container is fluidically connected to the active carbon filter by means of the cutoff valve and wherein, in the closed position of the cutoff valve, the operating fluid container is fluidically separated from the active carbon filter by means of the cutoff valve.

In a further preferred embodiment, the operating fluid container is designed in such a way that the at least one actuator is designed as a cutoff valve, which is arranged between an active carbon filter and the atmosphere. The cutoff valve is electrically and/or electromagnetically actuable/adjustable between an open position and a closed position, wherein, in the open position of the cutoff valve, the operating fluid container is fluidically connected to the atmosphere via the active carbon filter and via the cutoff valve and wherein, in the closed position of the cutoff valve, the operating fluid container and the active carbon filter are fluidically separated from the atmosphere by means of the cutoff valve.

The operating fluid container is preferably designed in such a way that the tank control device has a specified fill level signal input line via which data representing a specified fill level can be transmitted to the tank control device, wherein the tank control device is designed to issue the filling stop signal in such a way that the fill level of the operating fluid container corresponds to the specified fill level after the termination of the filling procedure.

A correspondingly designed operating fluid container is advantageous in that a single operating fluid container can be used for different markets (e.g. USA, Europe, Japan) in which different shut-off characteristics are preferred. This is the case since, by transmitting data representing the specified fill level via the specified fill level signal input line, it is then possible for the person carrying out the refueling to implement different top-ups of the tank. For example, in the case of a first specified fill level, it is possible to top up the tank again up to three times. In the case of a second specified fill level, it is possible to transmit a signal to a filling device which results in the filling device continuing the filling of the operating fluid container at a reduced filling rate so that the operating fluid rises in the filler pipe and also remains therein for a predetermined time after the termination of the filling procedure so that the person carrying out the refueling can see the operating fluid in the filler pipe (Japanese shut-off behavior).

The operating fluid container is furthermore preferably designed in such a way that the tank control device has a price signal input line, via which the price information data of operating fluid to be dispensed into the operating fluid container can be transmitted. The tank control device here is designed in such a way that, taking into account the price information data and the specified fill level, it issues the filling stop signal in such a way that, after the termination of the filling procedure, a price of the operating fluid dispensed into the operating fluid container corresponds to a flat currency amount.

The object on which the present invention is based is furthermore achieved by a method for filling an operating fluid container by means of a filling device, wherein the operating fluid container has the features of one of the operating fluid containers described above and wherein the method has the following method steps:
- transmitting a venting signal to at least the service and/or refueling vent valve by means of the tank control device;
- identifying the fill level of the operating fluid container by means of the fill level sensor; and
- issuing a filling stop signal to at least one actuator when the fill level of the operating fluid container has reached a specified fill level, wherein the specified fill level is lower than a maximum filling level of the operating fluid container.

The method according to the invention is advantageous in that the termination of the filling procedure is initiated in an automated manner before the maximum filling level of the operating fluid container is reached, so that, after the termination of the filling procedure, different procedures for topping up the tank can be implemented either by the person carrying out the refueling (manually) or on the part of the filling device, which procedures for topping up the tank differ from one another as specified by the market.

The method preferably furthermore has the following method steps:
- establishing a data exchange connection between the tank control device and the filling device;
- transmitting a filling start signal from the tank control device to the filling device via the data exchange connection when the venting signal is transmitted to the service and/or refueling vent valve, whereupon the filling device starts with the delivery of operating fluid into the operating fluid container; and
- transmitting a second filling stop signal from the tank control device to the filling device via the data exchange connection when the filling stop signal is transmitted to at least one of the actuators, whereupon the filling device terminates the delivery of the operating fluid.

In the method, a further filling start signal is furthermore preferably transmitted from the tank control device to the filling device after the second filling stop signal has been transmitted from the tank control device to the filling device, so that a further filling of the operating fluid container by the filling device takes place until an automatic shut-off of the filling procedure is implemented by the filling device.

The automatic shut-off by the filling device conventionally takes place in that the operating fluid in the filler pipe of the operating fluid container rises until a shut-off opening of a nozzle of the filling device is reached. The further filling start signal, which is transmitted from the tank controlling device to the filling device, is preferably transmitted three times in succession so that three top-ups of the tank can be implemented on the part of the filling device. The topping up of the tank preferably takes place on the part of the filling device at a reduced filling rate, for example of 5 liters per minute. A corresponding automated topping up of the tank ensures a completely filled operating fluid container and is of particular significance for the European market.

The method is preferably designed in such a way that the filling stop signal is issued to the service and/or vent valve when the fill level of the operating fluid container has reached the specified fill level and a currency amount of the operating fluid quantity delivered by the filling device corresponds to a flat currency amount.

The corresponding method is advantageous in that, after the termination of the filling procedure by the person carrying out the refueling, the payment to be made is a flat currency amount. The corresponding shut-off method is of particular significance for the US American market.

The method is furthermore preferably designed in such a way that it has the following method steps:
- establishing a data exchange connection between the tank control device and the filling device;
- transmitting a filling start signal from the tank control device to the filling device via the data exchange connection when the venting signal is transmitted to the service and/or refueling vent valve, whereupon the filling device starts with the delivery of operating fluid into the operating fluid container; and
- transmitting a ventilation stop signal to the service and/or refueling vent valve by means of the tank control device so that venting of the operating fluid container is stopped, and simultaneously transmitting a signal from the tank control device to the filling device, by means of which a reduction in a delivery rate of the filling device is initiated.

The correspondingly designed method results in the operating fluid container being filled in such a way that, at the end of the filling procedure, the venting of the operating fluid container is stopped and the filling speed on the part of the filling device is simultaneously reduced so that the filling procedure is terminated when the operating fluid in the filler pipe of the operating fluid container rises and an automatic shut-off is implemented on the part of the filling device (orifice hole). In this case, the operating fluid remains visible to the person carrying out the refueling in the filler pipe/filler neck of the operating fluid container. Finally, a further venting signal followed by a venting stop signal can preferably be issued to the service and/or refueling vent valve by the tank control device, whereby the fluid column flows out of the filler pipe into the container. The corresponding shut-off method is of particular significance for the Japanese market.

A flat currency amount is understood to refer to a currency amount which has no decimal digits (for example € 37 or $42 etc.).

An electric or electromagnetic adjustability of an actuator is understood to refer to an electromechanical adjustment of the actuator.

The tank controlling device can be designed as a separate electronic device. However, the tank controlling device can also be designed as part of an on-board computer system of the motor vehicle and represent a subunit of the on-board computer system.

BRIEF DESCRIPTION OF THE DRAWINGS

Further advantages, details and features of the invention are revealed below in the explained exemplary embodiments. In this regard, the figures show in detail.

DETAILED DESCRIPTION OF THE EMBODIMENTS

In the description now described below, the same reference numerals denote the same components or the same features, which means that a description which relates to a component with reference to one figure also applies for the other fingers so that repetition of the description is avoided.

In the description below, the present invention is explained with reference to an operating fluid container 10 designed as a motor vehicle tank 10. However, the operating fluid container 10 can also be designed as a urea container, water container or generally as a container receiving an operating fluid.

Figure 1:
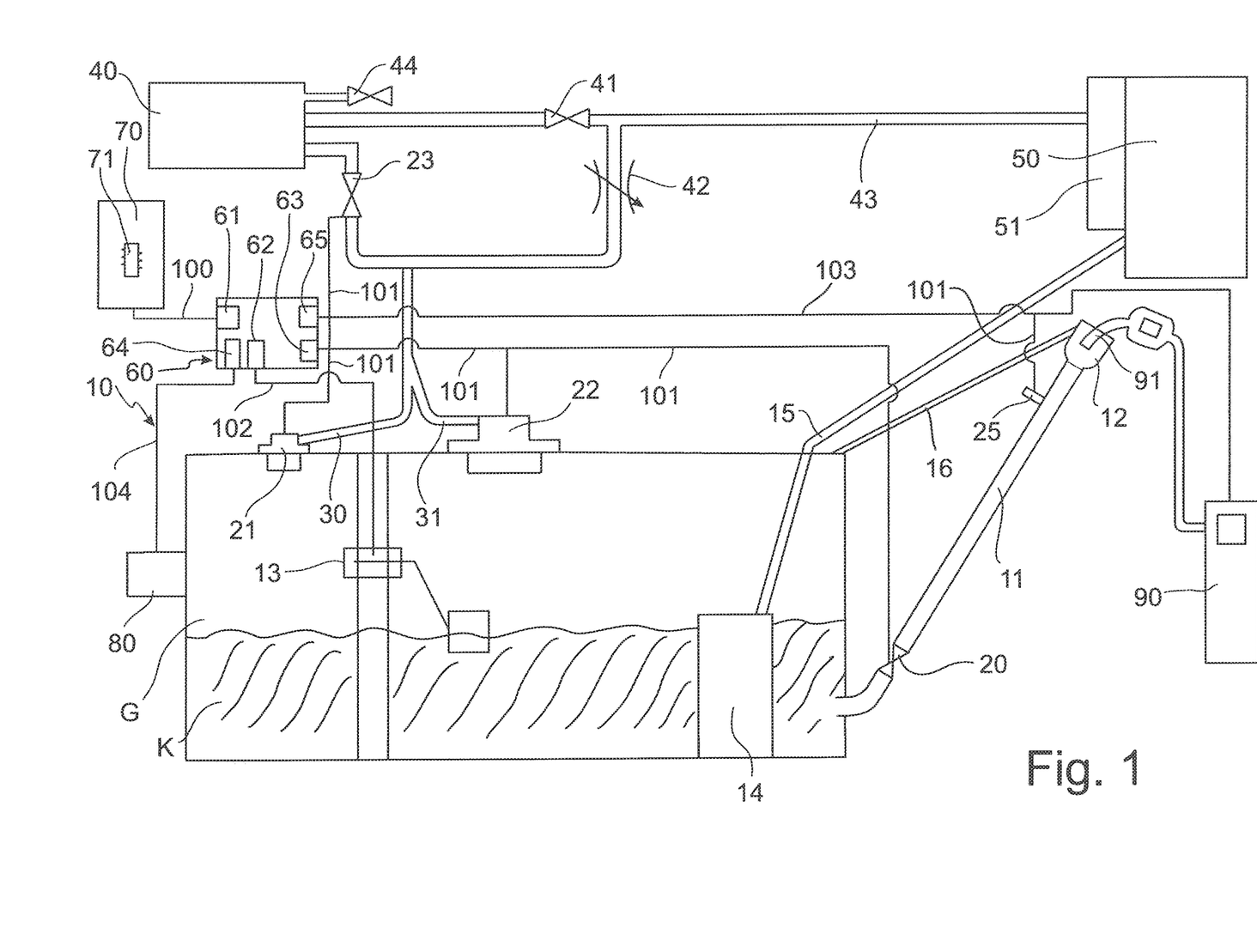
FIG. 1: a schematic illustration of an operating fluid container according to the invention.

FIG. 1 shows a schematic illustration of a motor vehicle tank 10. The motor vehicle tank 10 accommodates a certain quantity of fuel K and moreover a gas volume G, which is conventionally saturated with hydrocarbons. For dispensing fuel K, the motor vehicle tank 10 has a filler pipe 11 on which a filler neck 12 is arranged at its end remote from the fuel tank 10, which filler neck is designed for receiving a nozzle 91 of a filling device 90. The motor vehicle tank 10 furthermore accommodates an operating fluid delivery device 14 which is designed as a fuel delivery device 14 and can also be referred to as a fuel pump 14 in the illustrated exemplary embodiment. The fuel pump 14 is fluidically connected via a fuel line 15 to an engine 50 of a motor vehicle (not illustrated in the figure) for delivering the fuel K to the engine 50. The motor vehicle 10 can furthermore comprise a recirculation line 16 which is fluidically connected to the motor vehicle tank 10 and a volume surrounded by the filler neck 12. The recirculation line 16 serves for gas exchange between the motor vehicle tank 10 and the filler neck 12 during a refueling procedure of the motor vehicle 10 and is merely optionally provided, conventionally for the US American market.

The motor vehicle tank 10 furthermore comprises a fill level sensor 13, a tank control device 60 and at least one electrically and/or electromechanically actuable actuator 20, 21, 22, 23, 24, 25, 44 by means of which the termination of a filling procedure of the motor vehicle 10 can be initiated. The manner in which the termination of a filling procedure of the motor vehicle tank is initiated is described further below. The tank control device 60 has a data output unit 63 via which data and/or signals can be transmitted to the actuators 20-25 via a first data exchange connection 101. The first data exchange connection 101 can also be referred to as a first data line 101 or as a first signal line 101 or generally as a first electrical line 101.

The fill level sensor 13 is designed to transmit data representing a fill level of the motor vehicle tank 10 to the tank control device 60 via a second data exchange connection 102. To this end, the tank control device 60 has a second data receiving unit 62 via which the second data exchange connection between the fill level sensor 13 and the tank control device 60 is enabled. The second data exchange connection 102 can also be referred to as a second data line 102 or as a second signal line 102 or generally as a second electrical line 102.

The tank control device 60 is in turn designed to transmit a filling stop signal to at least one actuator 20-25, 44 via the first data exchange connection 101 upon receiving data which represent a predetermined fill level of the operating fluid container 10, wherein the at least one actuator 20-25, 44 initiates the termination of a filling procedure of the motor vehicle tank 10 upon receiving the filling stop signal. The data received by the tank control device 60, which represent the fill level of the motor vehicle tank 10, are transmitted from the fuel level sensor 13 to the tank control device 60 via the second data exchange connection 102 and the second data receiving unit 62.

By providing the motor vehicle tank 10 with the fill level sensor 13, the tank control device 60 and the electrically and/or electromagnetically actuable actuators 20-25, 44, the motor vehicle tank 10 designed in this way enables the termination of a filling procedure of the motor vehicle 10 to be initiated by the tank control device 60 before a maximum fill height of the motor vehicle 10 is reached, for example. Since the filling procedure is not initiated mechanically, but electrically and/or electromagnetically, which corresponds to an electromechanical actuation in the present case, compensation of a possible tilt of the motor vehicle tank 10 can be implemented on the part of the tank control device 60. This is the case since the termination of the filling procedure is not realized by a valve body floating in a valve but is instead initiated by means of an electrical signal which is issued by the tank control device 60.

Since the termination of the filling procedure is initiated by the tank control device 60, the filling stop signal can be issued to one of the actuators 20-25, 44 at a point in time before the maximum filling height of the motor vehicle tank 10 is reached, so that, after issuing the filling stop signal, a market-specific shut-off can then be implemented taking into account different shut-off characteristics. It is thus possible, for example, that the filling procedure is terminated shortly before reaching a maximum filling height of the motor vehicle tank 10, whereupon the filling device 90 continues the filling procedure at a reduced filling speed, for example, until a fuel quantity dispensed into the motor vehicle tank 10 corresponds to a flat currency amount. A flat currency amount here is understood to refer to a currency amount which has no decimal digits or in which the decimal digits are 0. Examples of a flat currency amount are EUR 37 or 42 dollars or 5100 yen.

It is furthermore also possible, after initiating the termination of the filling procedure, to continue the filling on the part of the filling device 90 at a reduced delivery rate so that, despite preventing a venting of the motor vehicle tank 10, for example, fuel dispensed into the filler pipe 11 rises slowly in the filler pipe 11 and, after reaching a shut-off bore 92 (see FIG. 2) of the nozzle 91, the fuel remains for a predetermined time in the filler pipe 11 or in the filler neck 12 before slowly running into the motor vehicle tank 10 so that the fuel can be perceived visually by the person carrying out the refueling.

It is furthermore also possible to initiate the termination of the filling procedure by issuing a filling stop signal from the tank control device 60 to one of the actuators 20-25, 44 at a point in time before reaching the maximum filling height of the motor vehicle tank 10, which then also enables the tank to be topped up manually up to three times.

The motor vehicle tank 10 having actuators 20-25, 44 is illustrated in FIG. 1. However, the present invention should not be understood to imply that all of the actuators 20-25 are required to initiate a termination of the filling procedure of the motor vehicle tank 10. Instead, a termination of the filling procedure of the motor vehicle tank 10 can be initiated by merely a single electrically and/or electromagnetically actuable actuator 20-25, 44. Consequently, the present invention should be understood in such a way that the motor vehicle tank 10 according to the invention can also have merely one single electrically and/or electromagnetically actuable actuator 20-25, 44. FIG. 1 should therefore be understood such that the motor vehicle tank 10 has at least one of the electrically and/or electromagnetically actuable actuators 20-25, 44. However, the motor vehicle tank 10 can also have a plurality of the electrically and/or electromagnetically actuable actuators 20-25, 44.

According to a first embodiment of the present invention, the electrically and/or electromagnetically actuable actuator 22 is designed as a refueling vent valve 22 which is arranged in the motor vehicle tank 10. In the illustrated exemplary embodiment, a service vent valve 21 is closed during the refueling whilst the refueling vent valve 22 is open during the refueling. The service vent valve 21 is fluidically connected by means of the service vent line 30, and the refueling vent valve 22 is fluidically connected by means of a refueling vent line 31, to an active carbon filter 40 for filtering hydrocarbons. The service vent line 30 and the refueling vent line 31 here are combined upstream of the active carbon filter 40 to form a common vent line and are in fluidic connection with one another. Upon receiving a filling stop signal, which is issued from the tank control device 60 to the refueling vent line 22 via the data output unit 63, the refueling vent valve 22 closes so that venting of the motor vehicle tank 10 during the refueling procedure is prevented. Through the further introduction of fuel via the filler pipe 11 into the motor vehicle tank 10, the internal pressure of the tank rises so that fuel introduced into the filler pipe 11 rises in the filter pipe 11 until the fuel reaches the shut-off bore 92 of the inserted nozzle 91 (see FIG. 2), whereby the filling procedure is terminated.

The refueling vent valve 22 is electrically and/or electromagnetically actuable/adjustable between an open position and a closed position, wherein, in the open position thereof, the motor vehicle tank 10 is fluidically connected to the atmosphere via the refueling vent valve 22 via the active carbon filter 40 and wherein, in the closed position refueling vent valve 22, the motor vehicle tank 10 is fluidically separated from the atmosphere.

It is shown in FIG. 1 that the fluidic connection of the motor vehicle tank 10 to the atmosphere takes place via the active carbon filter 40 and a flushing valve/outlet valve 41 or a diagnostic valve 44, although the active carbon filter 40 is optional rather than obligatory for the first embodiment present invention.

In a second embodiment of the present invention, the motor vehicle tank 10 has an active carbon filter 40 which is fluidically connected to the service vent valve 21 and the refueling vent valve 22 and therefore the motor vehicle tank 10 via a cutoff valve 23. In the illustrated exemplary embodiment, the service vent valve 21 and the refueling vent valve 22 do not necessarily have to be electrically and/or electromagnetically actuable; rather, only the cutoff valve 23 has to be electrically and/or electromagnetically actuable. However, it is of course also possible that the service vent valve 21 and also the refueling vent valve 22, in addition to the cutoff valve 23, are also electrically and/or electromagnetically actuable in the second exemplary embodiment of the present invention.

The cutoff valve 23 is arranged between the motor vehicle tank 10 and the active carbon filter 40 and is electrically and/or electromagnetically actuable/adjustable between an open position and a closed position, wherein, in the open position of the cutoff valve 23, the motor vehicle tank 10 is fluidically connected to the active carbon filter 40 by means of the cutoff valve 23 and wherein, in the closed position of the cutoff valve 23, the motor vehicle tank 10 is fluidically separated from the active carbon filter 40 by means of the cutoff valve 23. Upon receiving a filling stop signal which is transmitted from the data output unit 63 of the tank control device 60 to the cutoff valve 23 via the first data exchange connection 101, the cutoff valve 23 closes so that venting of the fuel container 10 during the refueling procedure is prevented, whereby the internal pressure of the motor vehicle tank 10 rises as a result of fuel being further dispensed into said motor vehicle tank via the filler pipe 11. Through the further introduction of fuel into the filler pipe 11, the fuel in the filler pipe 11 rises until a shut-off bore 92 of the nozzle 91 (see FIG. 2) is reached, whereupon the filling procedure is terminated.

In a third embodiment of the present invention, the actuator 20 is designed as a non-return valve 20, which is arranged in the filler pipe 11. The non-return valve 20 is electrically and/or electromagnetically actuable between an open position and a closed position, wherein, in the open position of the non-return valve 20, the motor vehicle tank 10 is fluidically connected to the filler pipe 11 and wherein, in the closed position of the non-return valve 20, the motor vehicle tank 10 is fluidically separated from the filler pipe 11 by means of the non-return valve 20 or at least the clear width of the filler pipe 11 is reduced by means of the non-return valve 20.

Upon receiving a filling stop signal, which is issued from the data output unit 63 of the tank controlling device 60 to the non-return valve 20 via the data exchange connection 101, the non-return valve 20 is transferred into its closed position, whereupon fuel which is introduced into the filler pipe 11 can no longer be introduced into the motor vehicle tank 10 or can only be introduced at a slower speed. Through the further introduction of fuel into the filler pipe 11, the fuel in the filler pipe 11 rises until the shut-off bore 92 of the nozzle 91 is reached, whereupon the filling procedure is terminated.

A correspondingly designed motor vehicle tank 10 is advantageous in that pressure does not have to be built up within the motor vehicle tank 10 to terminate the filling procedure, which means that the fuel tank 10 is at substantially zero pressure after the termination of the filling procedure. This reduces a load on an active carbon filter 40 which may be provided. It is moreover also possible to determine a fuel quantity in the motor vehicle tank 10 with greater precision since, owing to the lack of pressure acting on the motor vehicle tank 10, no deformation, or a reduced deformation, of the motor vehicle tank 10 is achieved.

According to a fourth embodiment of the present invention, the at least one electrically and/or electromagnetically actuable actuator 25 is designed as an interfering body 25 which is arranged in the filler pipe 11. The interfering body 25 here is electrically and/or electromagnetically actuable/adjustable between an open position and an interfering position, wherein, in the open position of the interfering body 25, the clear width of the filler pipe 11 is not reduced and wherein in the interfering position of the interfering body 25, this latter projects into the filler pipe 11 and therefore reduces the clear width of the filler pipe 11.

Upon receiving a filling stop signal which is issued from the data output unit 63 of the tank controlling device 60 to the interfering body 25 via the first data exchange connection 101, the interfering body 25 is transferred into its closed position, whereupon fuel introduced into the filler pipe 11 can no longer be introduced into the motor vehicle tank 10 or can only be introduced at a reduced speed. Through the further introduction of fuel into the filler pipe 11, the fuel in the filler pipe 11 rises until the shut-off bore 92 of the nozzle 91 is reached, whereupon the filling procedure is terminated.

A correspondingly designed motor vehicle tank 10 is advantageous in that pressure does not have to be built up within the motor vehicle tank 10 to terminate the filling procedure, which means that the fuel tank 10 is at substantially zero pressure after the termination of the filling procedure. This reduces a load on an active carbon filter 40 which may be provided. It is moreover also possible to determine a fuel quantity in the motor vehicle tank 10 with greater precision since, owing to the lack of pressure acting on the motor vehicle tank 10, no deformation, or a reduced deformation, of the motor vehicle tank 10 is achieved.

Figure 2:
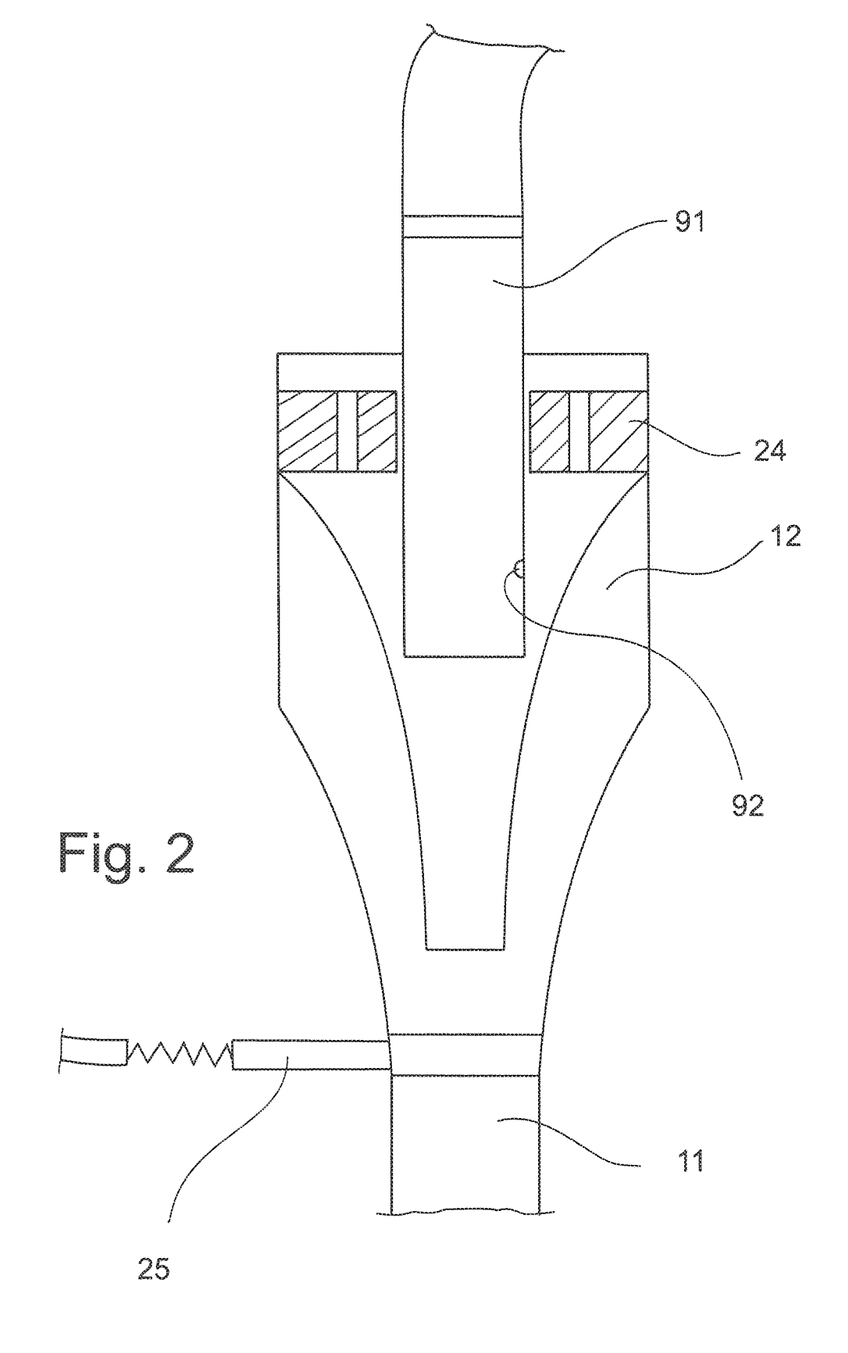
FIG. 2: a schematic sectional illustration of a filler pipe including a filler neck of a motor vehicle tank according to the invention.

A filler neck 12 including the filler pipe 11 of a motor vehicle tank 10 according to a fifth embodiment of the present invention is illustrated in a schematic cross-section in FIG. 2. In the motor vehicle tank 10 according to the fifth embodiment of the present invention, the at least one actuator 24 is designed as an electromagnet 24 which is arranged in the filer neck 12. In the illustrated exemplary embodiment, the electromagnet is 24 is designed in the form of an annular magnet 24. The electromagnet 24 here is actuable/switchable between an active state and a passive state, wherein, in the active state, the electromagnet 24 generates a magnetic field and wherein the electromagnet 24 does not generate a magnetic field in the passive state.

As a result of transmitting a filling stop signal from the data output unit 63 of the tank control device 60 to the electromagnet 24, this latter is transferred into its passive state so that a magnetic field is not generated and consequently a nozzle 91 inserted into the filler neck 12 is closed when this nozzle is correspondingly designed to be magnetically activatable or deactivatable. A correspondingly designed motor vehicle tank 10 is advantageous in that pressure does not have to be built up within the motor vehicle tank 10 to terminate a filling procedure, which means that, on the one hand, the load on an optionally provided active carbon filter 40 is lower and, moreover, deformation of the motor vehicle tank 10 as a result of being subjected to pressure does not take place, thereby enabling increased precision when determining a filling state of the motor vehicle tank 10. Moreover, the motor vehicle tank 10 according to the fifth embodiment is advantageous in that the filler pipe 11 does not even need to be filled with fuel to terminate the filling procedure, which means that a very accurate filling stop signal can be achieved.

According to a fifth embodiment of the present invention, the tank controlling device 60 is connected to the filling device 90 by means of a third data exchange connection 103. The data connection here extends via a signal sending unit 65, which can also be referred to as a data sending unit 65, and via the third data exchange connection 103, which is conventionally designed as a wireless communication connection. The wireless data exchange connection 103 can be realized via a near field communication (NFC), Bluetooth, GSM (global system for mobile communication) or via another wireless data connection. The tank control device 60 is designed to transmit the filling stop signal to the filling device 90 via the third data exchange connection 103 upon receiving data which represent the predetermined fill level of the fuel container 10. The filling stop signal sent to the filling device 90 results in no further fuel, or no further operating fluid, being introduced by the filling device 90 into the fuel tank 10/operating fluid container 10. This can be realized for example in that a fuel pump provided in the filling device 90 is stopped. Furthermore, stopping the filling procedure can be realized by closing the nozzle 91.

The correspondingly designed motor vehicle tank 10 is advantageous in that the filling stop can be realized very accurately since pressure does not have to be built up within the motor vehicle tank 10 to terminate the filling procedure.

It can furthermore be seen from FIG. 1 that the motor vehicle tank 10 furthermore comprises an inclination sensor 80 for determining an inclination of the motor vehicle tank 10. The inclination sensor 80 can be combined with any of the first to sixth embodiments of the present invention. The inclination sensor 80 is connected to the tank control device 60 via a fourth data exchange connection 104 in the form of a fourth data line 104, wherein the fourth data line 104 is connected to a third receiving unit 64 of the tank control device 60. The inclination sensor 80 is designed to transmit data determined by said inclination sensor and representing the inclination of the motor vehicle tank 10 to the tank control device 60.

In addition to the data transmitted by the fill level sensor 13, the tank control device 60 here is designed to receive the data transmitted by the inclination sensor 80 and to identify an actual fill level of the motor vehicle tank 10 taking into account the data of the fill level sensor 13 and the inclination sensor 80. The determination of the fill level of the motor vehicle tank 10 is therefore again enabled more precisely since a tilted position of the motor vehicle and therefore the motor vehicle tank 10 can again be taken into account more easily.

The motor vehicle tank 10 does not necessarily have to have the inclination sensor 80 to take into account a spatial position or inclination of the motor vehicle tank 10 since an inclination sensor is conventionally present in the on-board electronics of a motor vehicle, the data of which inclination sensor can be transmitted to the third data receiving unit 64 of the tank control device 60.

It can furthermore be seen from FIG. 1 that the tank control device 60 comprises a data receiving unit 61 via which electronic data can be transmitted to the tank control device 60. The data receiving unit 61 is connected to an electronic unit 70 via a data line 100 so that a data exchange connection between the tank controlling device 60 and the electronic unit 70 is enabled. The electronic unit 70 in turn comprises an electronic data store 71 so that the data stored in the electronic data store 71 can be transmitted to the electronic unit 60 via the data line 100. The data line 100 here can be such that data can be transmitted bi-directionally between the electronic unit 70 and the tank controlling device 60. However, the data line 100 can also be such that data can only be transmitted from the electronic unit 70 to the tank control device 60. The electronic unit 70 can be for example an on-board computer 70 of the motor vehicle having the motor vehicle tank 10. However, the electronic unit 70 can furthermore also be a mobile terminal 70, for example a smartphone 70. It is moreover also possible that the electronic unit 70 is a data processing system 70 which is designed for generating and providing a data cloud.

A fuel quantity to be dispensed into the motor vehicle tank 10 can consequently be determined/identified by the electronic unit 70. Data which represent the fuel quantity to be dispensed are transmitted to the tank control device 60 via the data line, wherein, upon reaching the fuel quantity to be dispensed, a filling stop signal is sent to at least one of the actuators 20-25, 44 via the first data exchange connection 101 and/or to the filling device 90 via the third data exchange connection 103, whereupon the termination of the filling procedure is initiated.

In the motor vehicle tank 10 illustrated in FIG. 1, the active carbon filter 40 is fluidically connected to an intake tract 51 of the engine 50 via a flushing valve 41 and a flushing line 43. A flushing of the active carbon filter 40 with intake air of the engine 50 is therefore enabled. It can furthermore be seen from FIG. 1 that the service vent line 30 and the refueling vent line 31 are fluidically connected to the intake tract 51 of the engine 50 via a throttle valve 42. It is therefore possible to conduct pressurized gas out of the fuel container 10 directly into the intake tract 51 via the throttle valve 42 and the flushing line 43 so that gas which is saturated with hydrocarbons can be used directly for combustion within the engine 50.

LIST OF REFERENCE SIGNS

10 Operating fluid container/motor vehicle tank
11 Filler pipe (of the operating fluid container)
12 Filler neck
13 Fill level sensor
14 Operating fluid delivery device/fuel delivery device/fuel pump
15 Operating fluid line/fuel line
16 Recirculation line
20 Actuator/non-return valve
21 Actuator/service vent valve
22 Actuator/refueling vent valve
23 Actuator/cutoff valve/FTIV
24 Actuator/electromagnet (within the filler neck)
25 Actuator/Interfering body (within the filler neck)
30 Service vent line
31 Refueling vent line
40 Active carbon filter
41 Flushing valve/outlet valve/purge valve
42 Throttle valve
43 Flushing line
44 Diagnostic valve/OBD valve
50 Engine
51 Intake tract (of the engine)
60 Tank control device/tank controlling device (of the operating fluid container/motor vehicle tank)
61 (First) data receiving unit (of the tank control device)
62 (Second) data receiving unit (of the tank control device)
63 Data output unit
64 (Third) data receiving unit (of the tank control device)
65 Signal transmitter unit/data transmitter unit
70 Electronic unit/on-board computer/mobile terminal/data processing system for generating and providing a data cloud)
71 Electronic data store (of the electronic unit)
80 Inclination sensor
90 Filling device
91 Nozzle
92 Shut-off opening (of the nozzle)
100 Data line (between the electronic unit and the tank control device)
101 (First) data exchange connection/data line/signal line/electrical line
102 (Second) data exchange connection/data line/signal line/electrical line
103 (Third) data exchange connection/data line/signal line/electrical line
104 (Fourth) data exchange connection/data line/signal line/electrical line
G Gas volume (in the operating fluid container/motor vehicle tank)
K Operating fluid/fuel (in the motor vehicle tank)

The invention claimed is:

1. An operating fluid container for a motor vehicle comprising:
a fill level sensor;
a tank control device;
an electronic unit transmitting electronic data to the tank control device and
an electrically and/or electromagnetically actuable actuator by means of which a termination of a filling procedure of the operating fluid container is initiated;
wherein
the tank control device is connected to the actuator by means of a first data exchange connection and to the fill level sensor by means of a second data exchange connection;
the fill level sensor is configured to transmit data representing a fill level of the operating fluid container to the tank control device via the second data exchange connection;
the tank control device is designed to transmit a filling stop signal to the actuator via the first data exchange connection upon receiving data which represent a predetermined fill level of the operating fluid container, wherein the predetermined level is lower than a maximum fill level of the operating fluid container;
the actuator initiates the termination of the filling procedure of the operating fluid container upon receiving the filling stop signal;
the tank control device is configured to implement a market-specific shut-off after the filling stop signal has been transmitted from the tank control device to the filling device; and
the data comprising the configuration for the market-specific shut-off characteristics is stored in an electronic data store of the electronic unit.

2. The operating fluid container of claim 1, wherein the tank control device is configured to receive data representing an inclination of the operating fluid container in addition to the data transmitted by the fill level sensor; and the tank control device is configured to identify an actual fill level of the operating fluid container by means of the data representing the fill level and the data representing the inclination of the operating fluid container.

3. The operating fluid container of claim 2 further comprising an inclination sensor determining the inclination of the operating fluid container, wherein the inclination sensor is connected to the tank control device via the second data exchange connection and/or a fourth data exchange connection, via which data identified by the inclination sensor and representing the inclination of the operating fluid container is transmitted to the tank control device.

4. The operating fluid container of claim 1, wherein
at least one actuator is configured as a service and/or refueling vent valve arranged in and/or on the operating fluid container;
the service and/or refueling vent valve is electrically and/or electromagnetically actuable between an open position and a closed position;
the operating fluid container is fluidically connected to a vent line by means of the service and/or refueling vent valve in the open position; and
the operating fluid container is fluidically separated from the vent line by means of the service and/or refueling vent valve in the closed position.

5. The operating fluid container of claim 1, wherein
at least one actuator is configured as a non-return valve arranged in and/or on a filler pipe leading into the operating fluid container;
the non-return valve is electrically and/or electromagnetically actuable between an open position and a closed position;
the operating fluid container is fluidically connected to the filler pipe by means of the non-return valve in the open position;
the operating fluid container is fluidically separated from the filler pipe by means of the non-return valve in the closed position; and
a clear width of the filler pipe is reduced by means of the non-return valve.

6. The operating fluid container of claim 1, wherein
at least one actuator is configured as a cutoff valve arranged between the operating fluid container and an active carbon filter;
the cutoff valve is electrically and/or electromagnetically actuable between an open position and a closed position;
the operating fluid container is fluidically connected to the active carbon filter by means of the cutoff valve in the open position; and
the operating fluid container is fluidically separated from the active carbon filter by means of the cutoff valve in the closed position.

7. The operating fluid container of claim 1, wherein
at least one actuator is configured as a cutoff valve arranged between an active carbon filter and the atmosphere;
the cutoff valve is electrically and/or electromagnetically actuable between an open position and a closed position;
the operating fluid container is fluidically connected to the atmosphere via the active carbon filter and via the cutoff valve in the open position; and
the operating fluid container and the active carbon filter are fluidically separated from the atmosphere by means of the cutoff valve in the closed position.

8. The operating fluid container of claim 1, wherein
the tank control device has a specified fill level signal input line via which data representing a specified fill level is transmitted to the tank control device; and
the tank control device is configured to issue the filling stop signal when the fill level of the operating fluid container reaches the specified fill level.

9. A method for filling the operating fluid container of claim 1 by means of a filling device comprising:
transmitting a venting signal to at least one service and/or refueling vent valve by means of the tank control device;
identifying the fill level of the operating fluid container by means of the fill level sensor; and
issuing a filling stop signal to at least one actuator when the fill level of the operating fluid container has reached a specified fill level, wherein the specified fill level is lower than a maximum fill level of the operating fluid container.

10. The method of claim 9 further comprising:
establishing a data exchange connection between the tank control device and the filling device;
transmitting a filling start signal from the tank control device to the filling device via the data exchange connection when the venting signal is transmitted to the service and/or refueling vent valve, whereupon the filling device starts with a delivery of operating fluid into the operating fluid container; and
transmitting a second filling stop signal from the tank control device to the filling device via the data exchange connection when the filling stop signal is transmitted to at least one of actuators, whereupon the filling device terminates the delivery of the operating fluid.

11. The method of claim 10, wherein a further filling start signal is transmitted from the tank control device to the filling device after the second filling stop signal has been transmitted from the tank control device to the filling device, so that a further filling of the operating fluid container by the filling device takes place until an automatic shut-off of the filling procedure is implemented by the filling device.

12. The method of claim 9, wherein the filling stop signal is issued to the service and/or vent valve when the fill level of the operating fluid container has reached the specified fill level and a currency amount of an operating fluid quantity delivered by the filling device corresponds to a flat currency amount.

13. The method of claim 9, further comprising:
establishing a data exchange connection between the tank control device and the filling device;
transmitting a filling start signal from the tank control device to the filling device via the data exchange connection when the venting signal is transmitted to the service and/or refueling vent valve, whereupon the filling device starts with a delivery of operating fluid into the operating fluid container; and
transmitting a ventilation stop signal to the service and/or refueling vent valve by means of the tank control device so that venting of the operating fluid container is stopped, and simultaneously transmitting a signal from the tank control device to the filling device by means of which a reduction in a delivery rate of the filling device is initiated.

* * * * *